United States Patent [19]

Conant et al.

[11] 3,710,702

[45] Jan. 16, 1973

[54] OPTICAL EXPOSURE HEAD

[75] Inventors: Robert K. Conant, Endicott, N.Y.; William H. Finke, San Jose, Calif.

[73] Assignee: International Business Machines Corporation, Armonk, N.Y.

[22] Filed: June 1, 1971

[21] Appl. No.: 148,353

[52] U.S. Cl. ....................................... 95/12, 95/1 R

[51] Int. Cl. ....................................................... G03

[58] Field of Search ................................. 95/12, 1 R

[56] References Cited

UNITED STATES PATENTS

| | | | |
|---|---|---|---|
| 3,323,414 | 6/1967 | Ritchie et al. | 95/12 |
| 3,330,182 | 7/1967 | Gerber et al. | 95/1 R |
| 3,614,224 | 10/1971 | Portman | 355/53 |

*Primary Examiner*—Samuel S. Matthews
*Assistant Examiner*—Kenneth C. Hutchison
*Attorney*—Hanifin and Jancin

[57] ABSTRACT

An optical exposure head having a light source, condensing lens and projection lens for tracing a configuration on a photosensitized plate moving at a constant velocity which is provided with a circular disc opening shutter and a circular disc closing shutter mounted for independent rotation in the light path from the light source and condensing lens with each shutter having an identical profile of a constant velocity cam. A plurality of reticles are provided which are indexed to bring a selected reticle in position adjacent the shutters for tracing the configuration thereon. The opening shutter is rotated in synchronism with the moving plate to uncover said configuration for tracing and the closing shutter is rotated in synchronism with the moving plate to cover said configuration and terminate the trace whereby uniform exposure of the configuration being traced is provided.

14 Claims, 12 Drawing Figures

INVENTORS
ROBERT K. CONANT
WILLIAM H. FINKE

BY G. R. Gugger
AGENT

OPTICAL EXPOSURE HEAD

BACKGROUND OF THE INVENTION

The trend of printed circuits of today is miniaturization and tighter tolerances. The smaller sizes and closer dimension of these printed circuits require similar and more stringent requirements of the glass masters from which they are produced. The result is an ever increasing need for better control of the light beam which exposes the glass masters and precision reticle positioning along with other process requirements.

The main control required of the light beam is constant intensity along with constant exposure time or the proper combination of each. Variation in either causes circuit patterns to vary in width and also result in poor edge definition. Even using multiple reticles, the positioning of these becomes a problem, particularly maintaining accuracy from reticle to reticle and being able to repeatably locate any one reticle.

Probably the main technique for tracing circuit patterns in the past has been the use of portional lamp control for controlling the light beam. With this method, lamp intensity is varied to compensate for changing exposure time. Exposure time is determined by the combination of tracing speed and the length of the reticle in the direction of trace. The operation as briefly described is that the light beam with the shutter closed is placed over the photosensitized glass plate at the point where the line is to begin. The shutter then opens, allowing the beam to expose a portion of the line to be generated, and the light beam moves relative to the glass plate starting the trace. During the acceleration period, the light intensity is varied appropriately to achieve best line quality. When the speed is low, the intensity is low and as the velocity increases to some constant value, the intensity increases proportionally. As the line approaches its termination, the velocity goes through a deceleration mode where intensity adjustment is again required.

The shortcomings of this method are that the reticle must have some physical length which results in some exposure gradient when the shutter first opens and there is also some difficulty in matching intensity of tracing speed. This difficulty of matching intensity is amplified by the fact that the lamp intensity degrades with age even at constant power level. Each of these problems contributes to line width variations and poor edge definition. Existing artwork generator shutters are able to provide uniform exposure at line terminations if the lines are generated by a series of small segments. However, this method is not satisfactory because there is a problem of abutting segments and also of stopping or slowing down the moving table which carries the photosensitized glass master.

The shortcomings in the art led to further development which evolved around the concept that since the best control can be achieved by tracing at a constant velocity and the poorest control occurs during acceleration and deceleration of the trace, use should be made of a completely constant velocity trace. This method successfully solved the aforementioned problems and is described in common assignee's copending U. S. application, Ser. No. 148,430, filed on June 1, 1971. The method is accomplished by placing the photosensitive glass plate in motion beneath a fixed light projection system. A rectangular reticle is provided which will define the line to be traced. Adjacent the reticle there is provided a pair of synchronized field shutters for beginning and terminating the trace. They are essentially a start shutter blade and a stop shutter blade which are independently moved at a constant velocity such that the image of the shutter is moving at the same velocity as the photosensitive glass plate.

With the sensitized glass master in motion, a line trace is started by moving the start shutter at a constant velocity to uncover the reticle and start exposure. The reticle is completely uncovered and as the glass plate continues to pass under it a continuous line is exposed. When it is desired to terminate the line, the stop shutter is moved at a constant velocity to cover the reticle. When the reticle becomes completely covered, the termination end of the line being traced is defined.

SUMMARY OF THE INVENTION

The present invention is concerned with providing a unique and improved synchronized field shutter and reticle arrangement for carrying out the above-described constant velocity trace. One feature of the present arrangement is the use of individual rectangular reticles each mounted in their respective holders in conjunction with a rotatable reticle index wheel. This gives the ability to position and locate various reticle configurations automatically for tracing different width lines. The holders are pie-shaped segments carried in wedge-shaped slots in the index wheel. The reticle to be used is pushed out from the center of the wheel in a radial direction by a movable pin and slide mechanism.

Another feature of the present arrangement is that a pair of synchronized field shutters is used wherein each shutter is identical to the other and takes the form of a thin, circular disc hub-mounted to its respective motor. The shutters are located as close to the reticle plane as possible and are in individual planes so they can rotate independent of each other. The periphery of each shutter disc has the profile of a constant velocity cam with the rise being equal to the length of the reticle and the shutters are driven by motors which are synchronized with the table or glass plate movement. The fact that the table travels at constant velocity and that the shutter cam profile is constant velocity, a synchronous relationship can be maintained between the rise on the cam profile and table travel. As a result, the shutter cam edge will uncover or cover the reticle at the same rate that the glass plate moves. The use of circular discs provides a simple and practical shuttering arrangement which requires a minimum of reset time.

The present reticle and shutter arrangement has been incorporated in a complete optical exposure head which has been provided with a unique rotation feature. This results in the flexibility of tracing at both 0° and 90° orientations without duplicating some hardware such as reticles and an additional pair of synchronized field shutters normally required to do this.

In order to achieve synchronism of the synchronized field shutters with the relative motion of the optical exposure head and the sensitized glass plate, circuitry is provided which makes use of reversible d.c. stepping motors for driving the shutters and a pulse counting and metering technique for controlling the stepping motors. Emitter means are provided which puts out a pulse for each unit of distance the table carrying the glass plate travels. A pulse metering counter meters one pulse to the step motor bi-directional drive for each occurrence of a specific number of emitter pulses. This number of emitter pulses is such that the distance moved by the table is exactly the distance moved by the image of the shutter on the sensitized glass. The metered control pulses to the motors are variably spaced according to step motor servo practice to obtain smooth acceleration, then constant velocity, and finally smooth deceleration. This is accomplished by providing a motor pulse counter to control the pulse metering counter. The reticle remains either fully covered or fully open during the acceleration and deceleration periods and the shuttering action of the active cam surface occurs during the constant velocity portion of the sequence.

The present improved arrangement provides a more practical and flexible optical exposure head for tracing lines and for obtaining the desired shuttering action whereby every portion of the line along its length, including points at the very front and very end, see an equal time of exposure as well as the same intensity. As a result, no exposure gradient exists because of reticle length and the table carrying the glass plate need not stop for terminations, thus greatly increasing overall machine speed. The unique circuitry provided for controlling the movement of the shutters insures that proper synchronization of the system is obtained to give the best tracing results.

It is, then, a primary object of this invention to provide a novel and improved optical exposure head for use in a photo tracing system.

Another object of the present invention is to provide an optical exposure head having a novel and improved arrangement of reticles and synchronized field shutters for tracing a line on a photosensitized glass plate with uniform exposure throughout the entire length of the line.

A further object of the present invention is to provide an optical exposure head having a novel and improved arrangement of reticles and a pair of circular field shutters each having the profile of a constant velocity cam and independently movable at a constant velocity for uncovering and covering a reticle to provide uniform exposure at the ends of a line being traced on a photosensitized plate.

A still further object of the present invention is to provide an optical exposure head having a novel and improved arrangement of a pair of synchronized field shutters and a plurality of reticles on a rotatable index wheel and means for selectively positioning a reticle for tracing a line on a photosensitized plate.

A further object of the present invention is to provide a novel and improved optical exposure head for tracing a line on a photosensitized plate and which is capable of rotation to provide tracing at both 0° and 90° orientations.

Another object of the present invention is to provide a novel and improved optical exposure head having a reticle and a pair of synchronized circular disc field shutters independently movable at a constant velocity for tracing a line on a moving photosensitive plate with the shutter image moving at the same velocity as the photosensitive plate.

Another object of the present invention is to provide a novel and improved optical exposure head having a reticle and a pair of synchronized circular disc field shutters independently movable by stepping motors for tracing a line on a moving photosensitive plate and pulse counting and metering circuitry for controlling the stepping motors to provide synchronism of the shutters with the photosensitive plate.

The foregoing and other objects, features and advantages of the invention will be apparent from the following more particular description of a preferred embodiment of the invention as illustrated in the accompanying drawings.

DESCRIPTION OF PREFERRED EMBODIMENT

Figure 3:
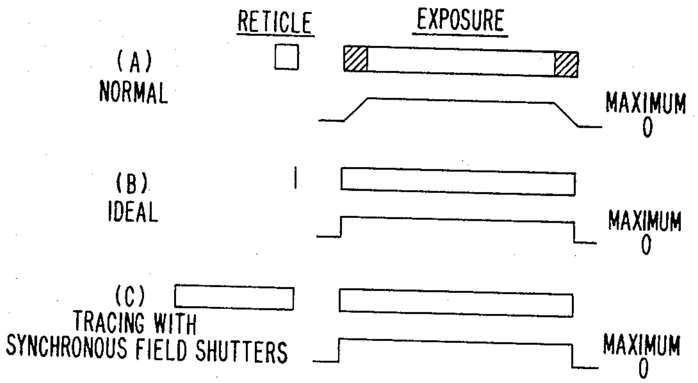
FIG. 3 is a chart illustrating line tracing exposure processes.

Referring first to the chart shown in FIG. 3, previous large-area artwork generators have used start-at-end-of-line and stop-at-other-end-of-line with proportional intensity control or step and repeat with flashing techniques, either stationary or on the fly. Each of these processes have both advantages and definite limitations such as output tolerances of the product and speed. Most of these systems made use of normal reticles that had approximately square aspect ratios. If this type of reticle were used with a fast shutter in a slow mode, then the output exposure might look like that shown at (*a*) on the chart. The grey areas at the beginning and end cannot be tolerated and this output is totally unacceptable for precise end-of-line termination requirements. Shown at (*b*) is the near perfect condition in which the reticle is as long as the output line is wide, and is extremely narrow in width. This is not very practical as the exposure time along the line has to be very slow or the unit area energy must be very high for proper exposure. To produce denser artwork patterns over large areas with tighter tolerances, the method found best for line tracing in a photo tracing machine is shown at (c). This method utilizes relatively low energy and makes use of synchronized field shutters to control the starting and ending of line segments while the line is being traced at a constant velocity.

Figure 2:
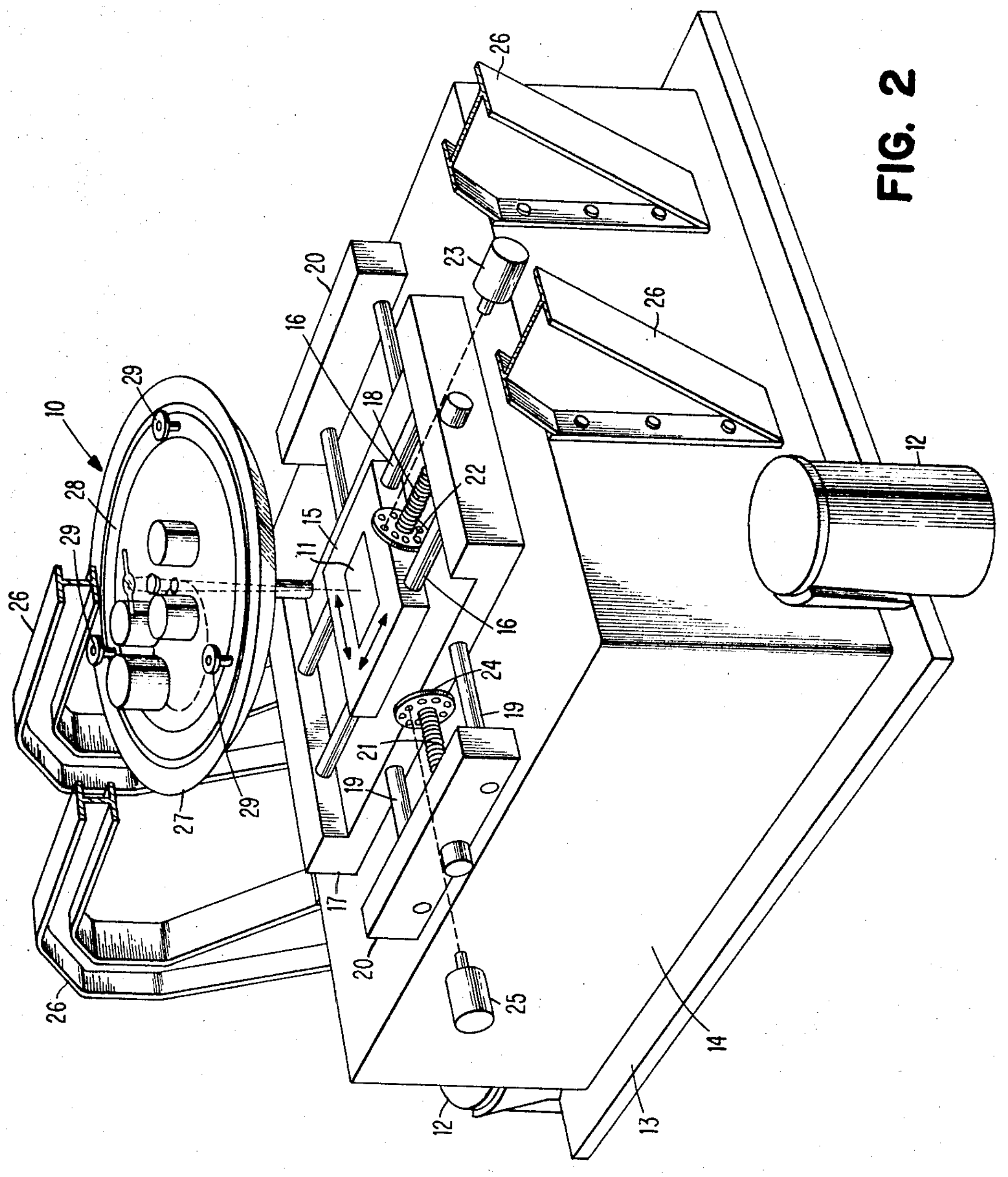
FIG. 2 is a partial diagrammatic view of the optical exposure head mounted over the x-y table drive.

Referring to FIG. 2, the optical exposure head 10 is part of a system called the photo tracing machine. Its role is to project the image of a reticle onto the photosensitized glass plate 11. A particular line segment is then produced by relative motion between the optical exposure head and the photosensitized glass plate. In the present application, the optical exposure head is stationary while the photosensitized glass plate 11 is moved in an x-y plane, one axis at a time. As will be seen, the trace direction will be parallel to the long side of a rectangular shaped reticle. To provide tracing capabilities in two axes at 90°, the optical exposure head has the ability to rotate 90° about the center of the reticle.

The photo tracing machine is supported on three pneumatic servos 12. These mounts provide effective isolation above 1 cycle per second. Attached to these mounts is a steel base plate 13 and above this base is a massive granite surface plate 14 which is supported on three recessed jack screws. The x-y table drive stage of the system is referenced directly to the main granite base. Any number of drive arrangements could be used and for purposes of illustration there is shown the well-known lead screw type. The photosensitive plate 11 is positioned on an upper base plate 15 which is slideably mounted on guide rods 16 fixed in a U-shaped bottom plate 17. Conventional lead screw drive means 18 are provided to drive the plate 15 in either direction along the rods 16. The bottom plate 17 is slideably supported on rods 19 disposed at right angles to the rods 16 and fixed between bracket members 20. Lead screw drive means 21 are provided to drive plate 17 in either direction along the rods 19, plate 17 also carrying plate 15 with it. Mounted on the lead screw 18 is a circular disc emitter 22 having holes around its periphery which are sensed by a photocell 23 and, in similar fashion, a circular disc emitter 24 and an associated photocell 25 are provided for the lead screw 21. As will be discussed later, these photocells sense the feed of the lead screws and provide output pulses which are used for synchronization purposes.

A massive cast iron superstructure consisting of four identical castings 26 forms two continuous overhead beams directly attached to the sides of the main granite base. Attached to these beams is a large ring casting 27 that provides lateral stability and a mounting base for the outer circular ring 28 of the optical head which is fastened by three z-axis adjustable locking mounts 29 for tilt and vertical position.

Figure 1:
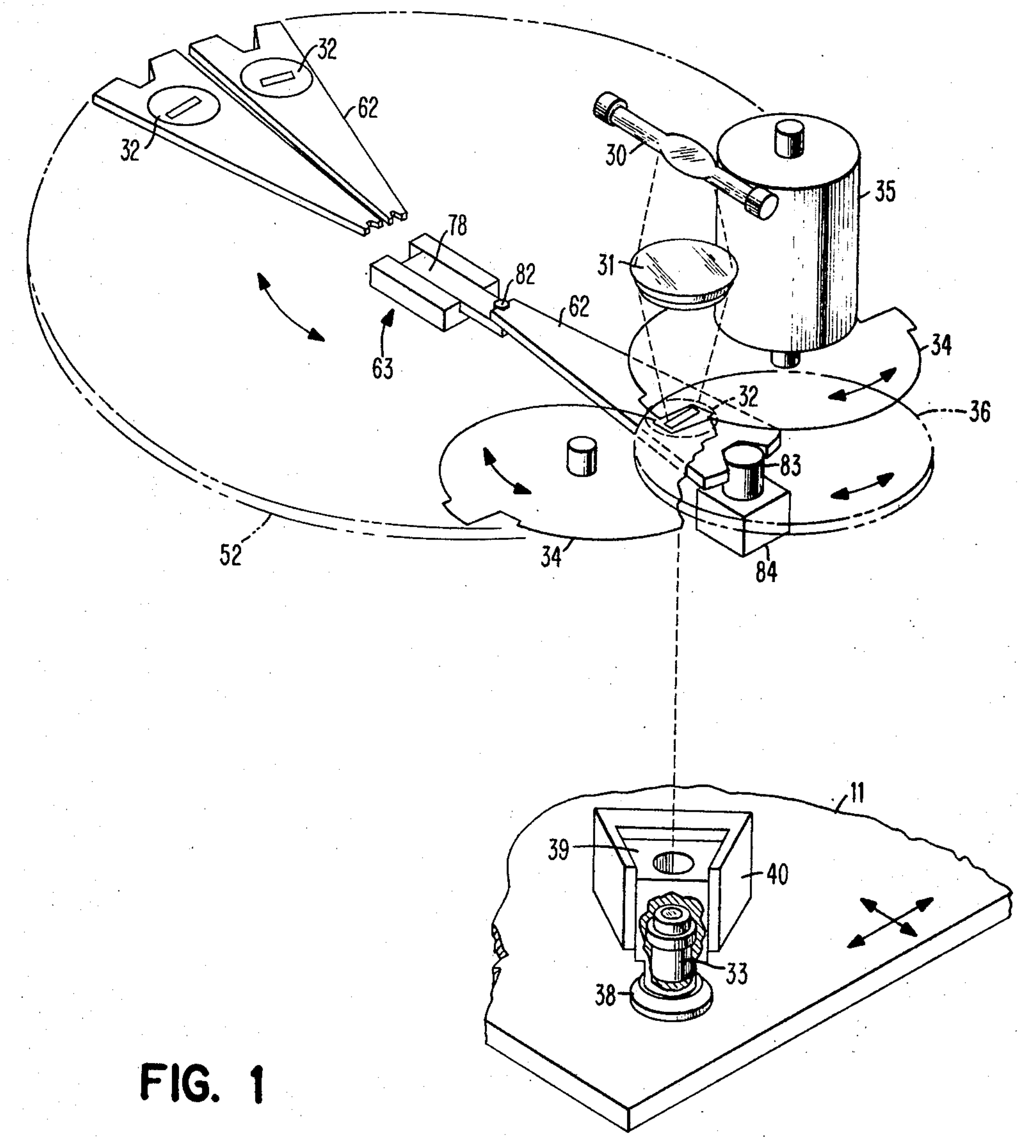
FIG. 1 is a partial diagrammatic view of the optical exposure head illustrating the principle of operation of the present invention.
Figure 8:
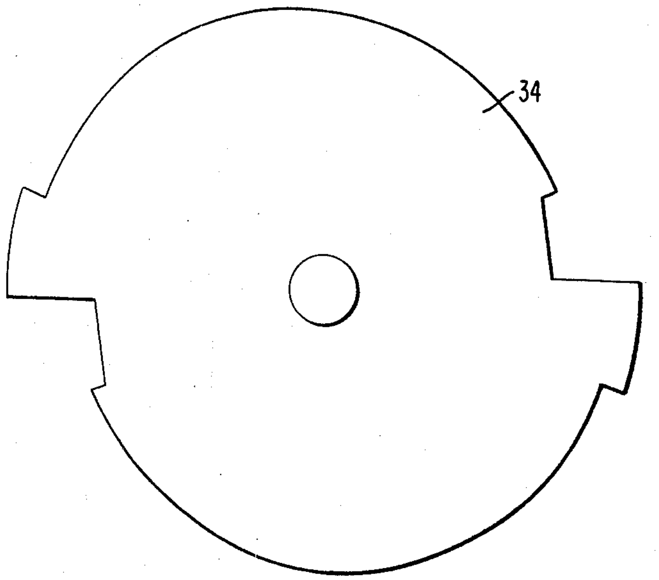
FIG. 8 is a plan view showing the contour of the circular disc field shutter.

The optical exposure head itself is composed of many components arranged in a fashion to provide the unique results obtained by the present invention. Referring now to the diagrammatic showing in FIG. 1, the light source 30 is a conventional mercury arc lamp which provides a near point source of light. The condensing lens system 31 illuminates the reticle field such that the intensity is uniform across that field. A particular reticle 32 is inserted into the field and defines the size line to be traced. The reticle configuration is preferably rectangular in shape and the width or dimension on the narrow side of the reticle is related to the line width that results by the magnification of the projection lens system 33. The reticle length is related to exposure time achieved at the tracing velocity. The actual dimension of the reticle length plays an important role in the special shuttering technique that is used. A pair of synchronized field shutters 34 is used to perform this shuttering. Each of these shutters is identical to the other and can be described as being a thin, circular disc hub-mounted to its respective stepping motor 35. They are located in the assembly so that they are as close to the reticle 32 plane as possible, but the pairs are in individual planes so they can rotate independent of each other. As shown more clearly in FIG. 8, the periphery of the synchronized field shutter has the profile of a constant velocity cam with the rise being equal to the length of the reticle 32. Although a two lobe cam is shown, a single lobe cam or a cam having more than two lobes could also be used, the choice being a design consideration in conjunction with the speed that the stepping motors 35 can be run. The stepping motors are synchronized with the movement of the table and glass plate 11 and the fact that the table travels at constant velocity and that the shutter cam profile is constant velocity, a synchronous relationship can be maintained between the rise on the cam profile and table travel. In other words, it is possible to cause the shutter 34 cam edge to uncover or cover the reticle 32 at the same rate that the glass plate 11 moves.

The sequence that the synchronized field shutters 34 go through for tracing a single line segment will now be described. For a particular trace direction one of the pair of shutters 34 is assigned the role of the opening shutter while the other becomes the closing shutter. Their functions reverse when tracing in the opposite direction. The closing shutter is set to the low point on the cam surface and would not restrict light passing through the reticle 32. The opening shutter is set to the high point on the cam surface and completely covers the reticle. As the photosensitized glass plate 11 is traversed under the optical exposure head at constant velocity, the opening shutter starts to turn at a synchronous speed. As the shutter turns, the cam surface falls causing the reticle to be uncovered in such a fashion that it is short at the beginning of the opening and as the cam falls the reticle becomes longer until the reticle is completely uncovered when the cam surface is at its lowest point. At this point the shutter stops. During this opening cycle, it is to be noted that the cam surface forms the fourth side of a variable length reticle and this fourth side, as the reticle is uncovered, defines the front end of the line being traced. The photosensitized glass plate 11 continues to pass under the optical exposure head exposing some length of line, but not yet its full length. This process continues until a line termination is desired at which time the other or closing shutter begins to turn. Its cam surface being at the low point begins to rise causing the reticle to be covered also in a synchronous fashion. During the closing cycle, the cam surface forms the fourth side of a variable length reticle which initially is its maximum length, but becomes increasingly smaller until the reticle is completely covered at which point the shutter stops. This fourth side of the variable length reticle, as before, defines the end of the line being traced, but in this case it is the line termination end.

The result of the shuttering cycle just described is that every portion of the line along its length, including points at the very front and very end, have seen an equal time of exposure as well as the same intensity. Hence, no exposure gradient exists because of the length of the reticle.

Because of long term variations in light intensity due to the lamp aging, the present system has incorporated a variable neutral density filter 36. This filter has the form of a circular disc and can be rotated with a servomotor 37, shown in FIG. 5. The filter is neutral density with the optical density changing with angular position. The unit is positioned in the light path between the source and the reticle plane so that it causes no distortions in the projection optics. The light beam impinges on only a small segment of the total filter 36 at any one time so by rotating the filter the intensity output can be varied depending on its angular orientation. By controlling the angular position of the filter in conjunction with an intensity feedback device (not shown) that senses at the image plane, the intensity output of the optical exposure head can be maintained at a constant level.

The projection lens system 33 in the present system can tolerate only minute focal length variations without affecting the sharpness of the image. To minimize errors of this sort, the system utilizes a constant focus air bearing 38. The projection lens mounts in a floating lens holder 39 which is restrained in the x and y axes by its guide 40, but slides in the z axis and is supported by a plano-spherical air bearing which floats on the glass plate 11. The combination of these devices allows the projection lens system to follow the contour of the glass plate, hence maintaining good image sharpness.

Figure 4:
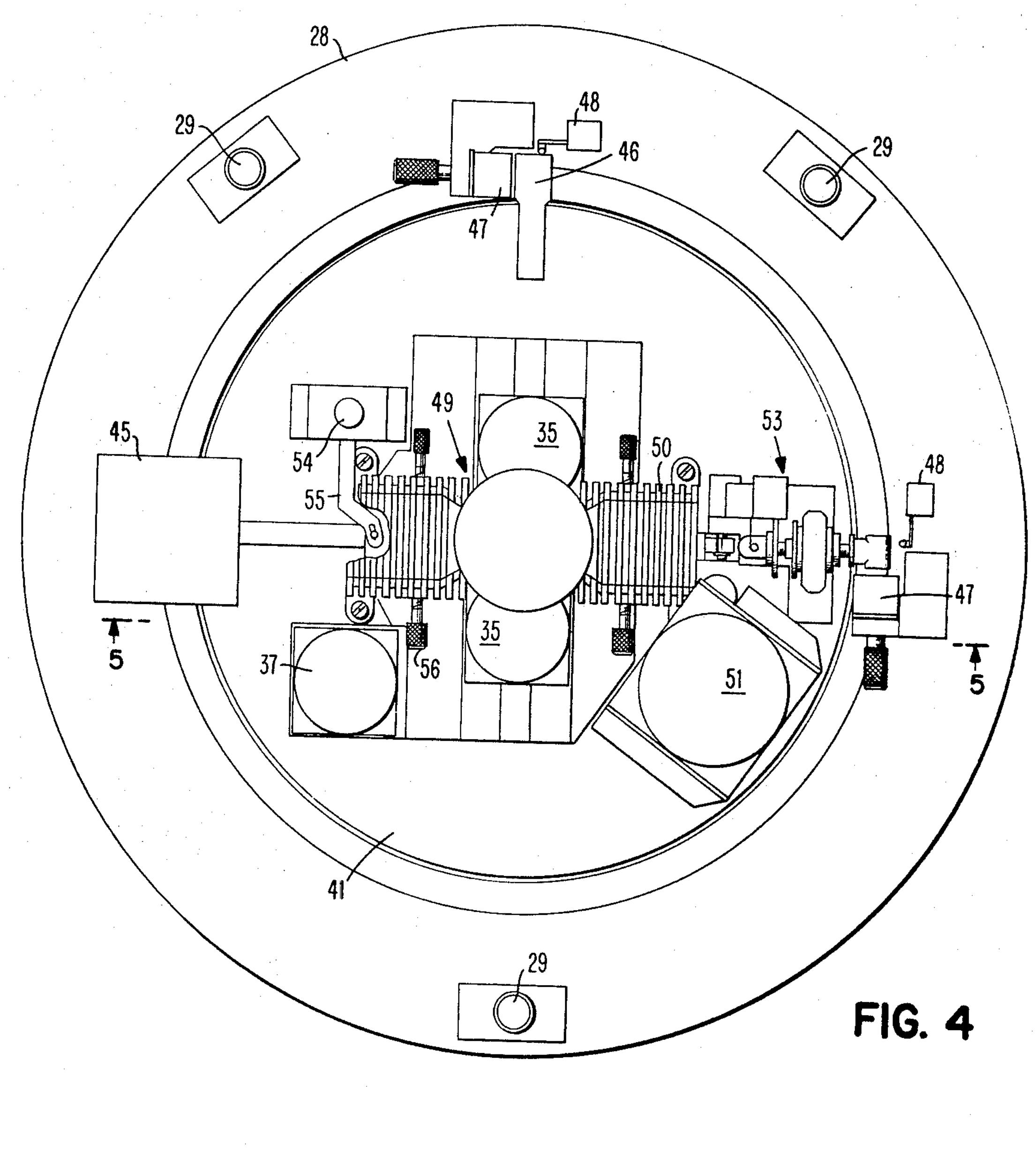
FIG. 4 is a plan view showing the top of the optical exposure head assembly.
Figure 5:
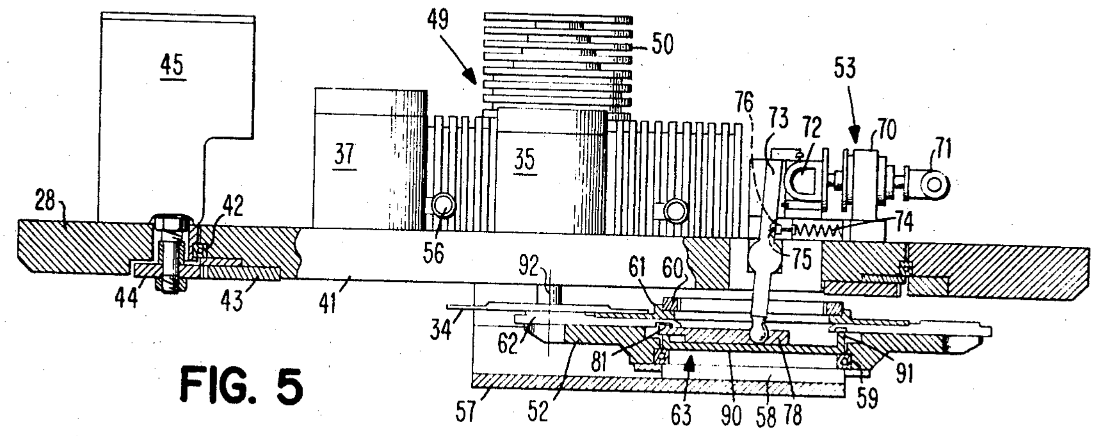
FIG. 5 is a partial sectional view taken on line 5—5 of FIG. 4 and showing the actuating mechanism for radially positioning a reticle.

As was previously mentioned, the optical exposure head is provided with a unique rotation feature which results in the flexibility of tracing at both 0° and 90° orientations and additional flexibility is provided by the use of a system of multiple reticles and a positioning device. Referring to FIGS. 4 and 5, the optical exposure head includes a circular plate 41 positioned for rotation within the circular ring 28 by means of a ring bearing mount 42 between the plate and ring. Fastened to the underside of plate 41 is a gear 43 which meshes with a gear 44 which in turn is driven by a motor 45 when it is desired to rotate the optical head. An arm 46 extending out from the plate 41 coacts against a pair of cushioned backstop members 47 which are fastened on ring 28 and extend into the path of the arm 46. The backstop members 47 are oriented 90° apart to allow for 90° rotation of the head in either direction. A pair of micro switches 48 sense when the head plate 41 approaches the end of its 90° travel to de-activate the motor 45.

The rotatable head plate 41 serves as a mounting plate for the major components of the system, and, as shown in FIGS. 4 and 5, in addition to the variable density filter motor 37 the top side of the plate supports the light housing 49 for the mercury arc lamp and condensing lens system, a finned dome arrangement 50 associated with the light housing for heat transfer purposes, the pair of stepping motors 35 for driving the synchronous field shutters 34, a stepping motor 51 for driving a multiple reticle index wheel 52, a drive unit 53 for positioning a reticle, and a rotary solenoid 54 for positioning an auxiliary shutter via an arm 55. The auxiliary shutter is not shown, but it is simply a thin blade which would be positioned over the reticle to block the light when no tracing operations are desired. Four adjustable set screws 56 are provided for orientation of the light.

Referring particularly to FIG. 5, fastened to the underside of plate 41 for rotation therewith is a dish-shaped casting 57. Mounted on a block portion 58 of the casting is a ring bearing 59 which rotatably supports the reticle index wheel 52. The reticle wheel is indexed when called upon by its stepping motor 51 which drives an internal gear 60 fastened to a cover plate 61 which forms the top of the reticle wheel assembly. As will be described in more detail next, the reticle wheel assembly includes a plurality of reticle holders 62 and a pin and slide block arrangement 63 for moving a desired reticle in position for a tracing operation.

Figure 6:
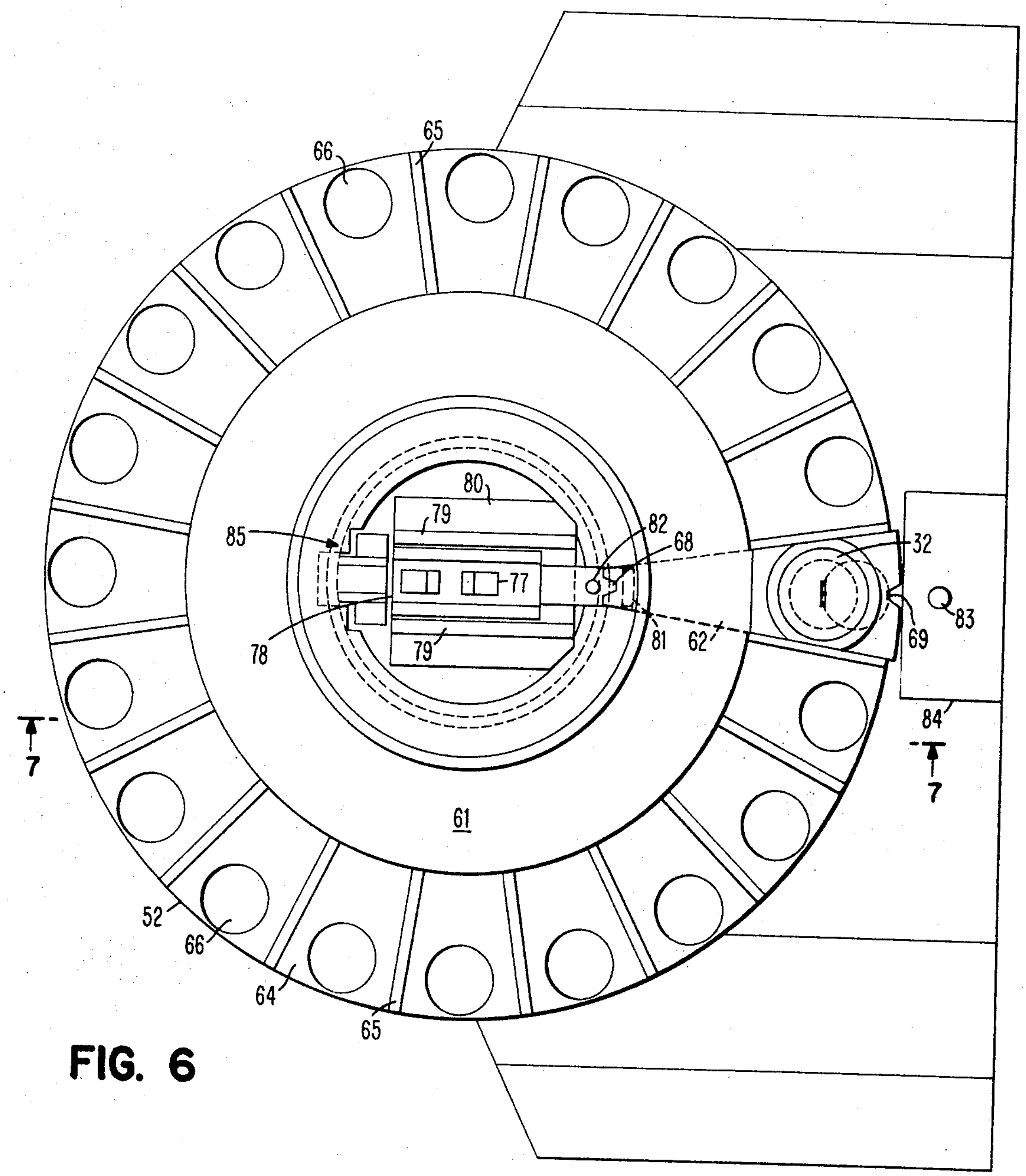
FIG. 6 is a plan view showing the top of the reticle wheel and the slide block for radially moving a reticle.
Figure 7:
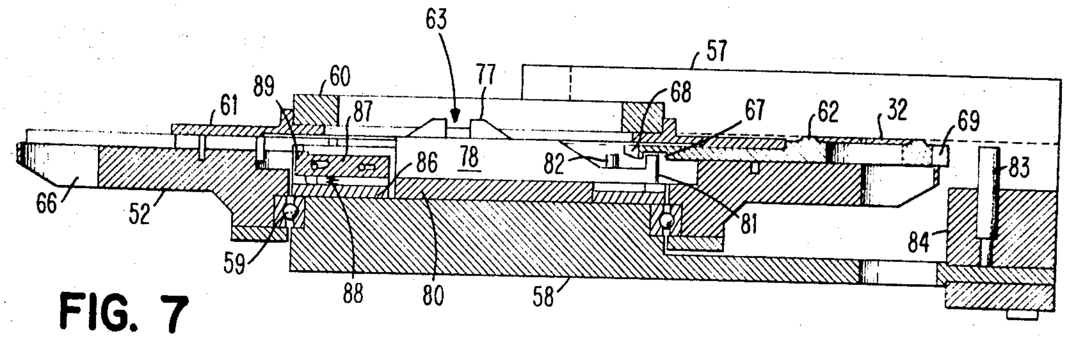
FIG. 7 is a partial sectional view taken on line 7—7 of FIG. 6.
Figure 11:
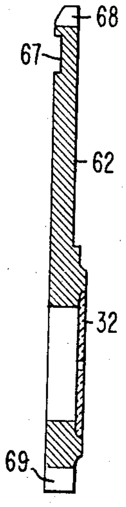
FIG. 11 is a sectional view taken on line 11—11 of FIG. 10.
Figure 10:
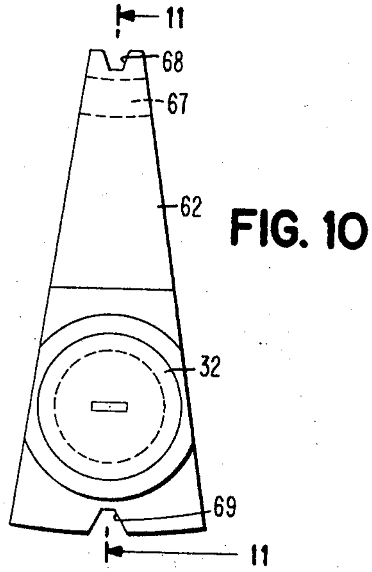
FIG. 10 is a plan view showing the top of a reticle and reticle holder.

Referring now to FIGS. 6 and 7, the reticle wheel 52 is provided around its periphery with 20 wedge-shaped slots 64 which are divided by suitable ribs 65. Each slot has a thru-opening 66 for the passage of the light beam during tracing and each slot may have slideably mounted therein the reticle holder 62 which is in the form of a pie-shaped segment. As shown in FIGS. 10 and 11, each reticle holder has a shouldered opening into which is mounted the reticle 32. The reticle is made of quartz coated with chrome which is photo exposed to produce any desired transparent configuration which is to be traced. In the present application, a rectangular configuration was chosen for tracing a line. A notch 67 is cut in the underside of the reticle holder and the ends of the holder are provided with the V-notches 68 and 69. As will be seen, these notches are used in the positioning of the reticle holder.

When not in use, the reticle holders are nested in their wedge-shaped pockets. The reticle to be used is pushed out from the center of the reticle index wheel 52 in a radial direction by the pin and slide block arrangement 63. Referring to FIG. 5, the drive unit 53 for operating the slide block arrangement comprises an air solenoid 70 having an inlet pipe 71 which is connected to a suitable source of air pressure. The solenoid operates a pusher member 72 which is adapted to coact against a lever arm 73 pivotally mounted in the rotatable head wheel 41. Also mounted in the solenoid housing is a spring 74 which is fastened to a roller pin 75 mounted in a semi-circular notch 76 in the lever arm 73.

Figure 9:
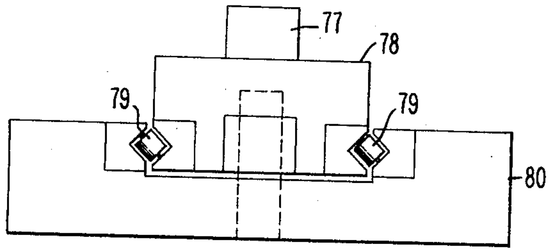
FIG. 9 is an end view of the slide block arrangement for radially moving a reticle.

Referring now to FIGS. 6, 7 and 9, the lower end of the lever arm fits into a notch formed by the two protrusions 77 extending from a slide block 78. As seen more clearly in FIG. 9, the slide block is notched to ride on a pair of roller bearings 79 mounted in a holder block 80 which is fastened to the casting 58 (FIG. 7). As shown in FIG. 7, the slide block 78 has at its front end a vertical lip 81 which extends into the notch 67 in the underside of the reticle holder 62. Also mounted on the slide block is a pin 82 which coacts with the notch 68 in the end of the reticle holder.

The reticle holder 62 in FIG. 5 is shown in its extended position for a tracing operation. To retract the holder, the air solenoid 70 is subjected to air pressure in which case the pusher member 72 pivots the lever arm 73 counterclockwise which in turn retracts the slide block 78 radially inward, the slide block carrying with it the reticle holder 62 it is hooked into, via the lip 81, so that it is in its retracted non-tracing position. Referring again to FIGS. 6 and 7, the reticle holder 62 is shown in its normal retracted position and with all 20 holders retracted, the reticle wheel 52 may be indexed by its stepping motor to bring the desired reticle in position to be operated upon by the slide block assembly. During the indexing of the reticle wheel, the notches 67 in the underside of the reticle holders pass over the vertical lip 81 on the slide block. When the desired reticle is in position, the wheel is stopped and the air pressure is removed from the air solenoid 70 causing the pusher member 72 to retract. The spring 74 now pivots the lever arm 73 in the opposite direction causing the slide block 78 to move radially outward. The pin 82 on the block moves the selected reticle holder radially outward until the notch 69 on the outer end of the holder nestles against a fixed stop and locating pin 83 mounted in a block 84. The pin 82 will be nestled in the notch 68 at the other end of the holder whereby the holder is positively retained in the precise location required for a tracing operation. It will be noted that the reticle 32 position in its holder is such that it is nearest the fixed pin 83 when located and the other end of the holder is farthest from the reticle. As a result, any locating errors due to moving parts, such as the slide mechanism and pin, are reduced resulting in excellent positioning of the reticle holder. Another benefit of the wedge-shaped holder design is that as it is pushed outward in a radial direction, considerable side clearance results between the holder and index wheel. This is desirable since then angular orientation of the wheel is not critical and does not influence the location of the holder. The result is excellent reticle 32 positioning repeatability.

There is provided, as shown in FIGS. 6 and 7, a latch block assembly 85 which comprises a bottom plate 86 and a pin and slot mounted upper plate 87 which is adapted for pivotal movement against a spring 88. The upper plate has a vertically extending lip 89 which fits into the notch 67 in the underside of each reticle holder 62. The assembly is disposed 180 degrees from the position of the reticle holder which is to be extended for a tracing operation and it serves two purposes. It secures the reticle holder that it engages against radial movement due to vibration from the slide block assembly when it operates on the reticle holder on the other side. Also, it defines a loading station for loading reticles into the reticle wheel. As the operator slides a reticle holder into the pocket at this station, the upper plate 87 will be cammed downward and then will snap back up when the vertical lip 89 engages the notch 67 in the underside of the holder. This will tell the operator that the holder is properly located in its pocket. Provision is also made for keeping the reticle holders from being moved out of position in their pockets except for at the loading station where the holder is engaged by the latch block assembly and at the tracing station where the holder is engaged by the slide block assembly. Referring to FIG. 5, a fixed circular retainer ring 90 is provided which is cut out at the loading and tracing stations with the remaining high rise portion 91 extending into the notches 67 in the underside of the reticle holders to retain them in position.

As was previously mentioned, the rotatability of the optical exposure head results in the flexibility of tracing at both 0° and 90° orientations. In this respect, it will be noted that the reticle wheel assembly is mounted to the underside of the rotatable head plate 41 in an off-center position, as shown in FIG. 5. The center of rotation of the head is on the axis line indicated at 92 which passes through the center of the reticle and it will be understood that when the optical head is rotated 90°, it carries the reticle wheel assembly on an arc such that at the end of 90°, the configuration of the reticle in position for tracing has been oriented 90°. In other words, for the rectangular reticle 32 shown in FIG. 1, instead of tracing parallel to the long side of the rectangle we would now be tracing parallel to the short side.

Figure 12:
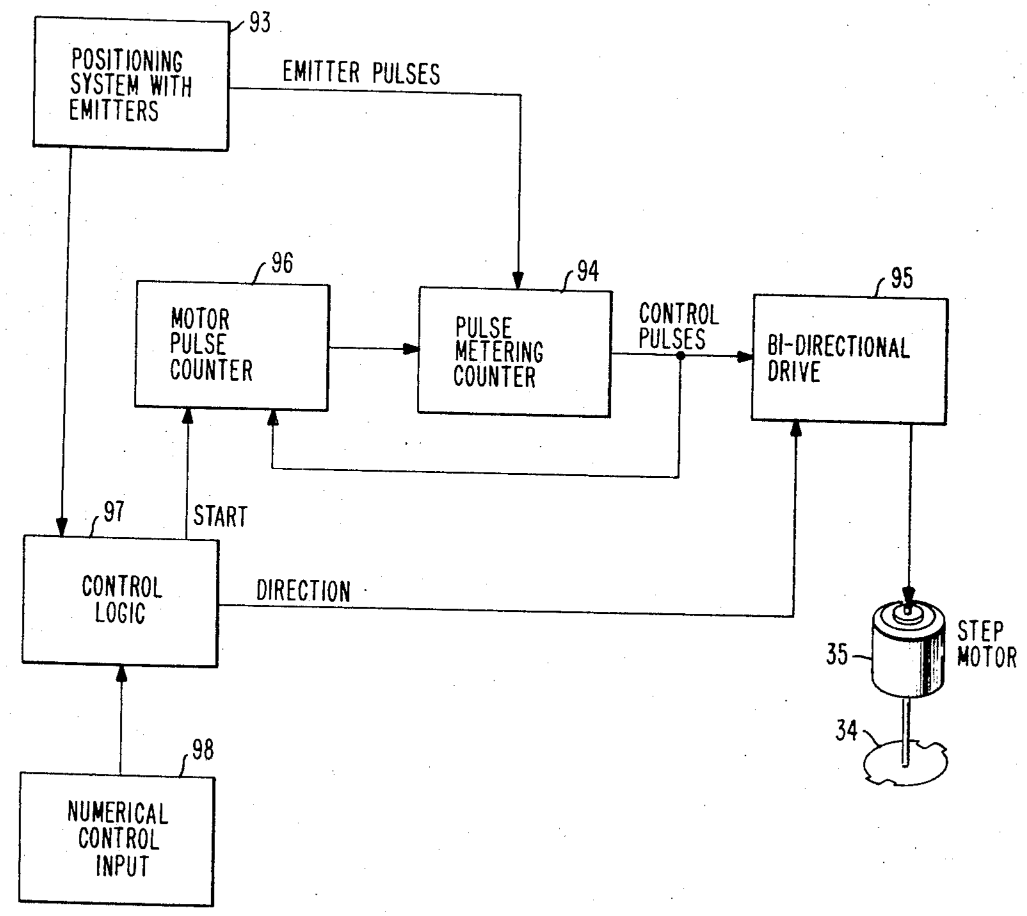
FIG. 12 is a block diagram showing the synchronized field shutter control system.

In the present system it is desired to synchronize so that it is known at any instant where the field shutter is in relation to the glass plate. Referring to FIG. 12, the method of achieving synchronism of the synchronized field shutters with the relative motion of the optical exposure head and the sensitized glass plate utilizes a positioning system with emitters which feeds a control system and the d.c. stepping motor for each shutter. The positioning system with emitters 93 comprises the lead screw x-y table drive and the associated disc emitters 22 and 24 previously described in connection with FIG. 2. The emitters on the positioning system put out a pulse for each unit of distance (inches per pulse) and there would typically be a high number of pulses per inch because it is desirable to divide the table travel up into fine increments. The emitter pulses are used to feed two identical control circuit systems, only one of which is shown in FIG. 12, there being one system for each stepping motor 35 and associated field shutter 34.

The emitter pulses feed a pulse metering counter 94 which meters one control pulse to a stepping motor bi-directional drive unit 95 for each occurrence of a specific number of emitter pulses. This number of emitter pulses is such that the distance moved by the positioning system is exactly the distance moved by the image of the shutter on the sensitized glass. In the present application, the pulse metering counter puts out one pulse for 30 emitter pulses. This can be varied depending on the lift of the shutter profile and the optical de-magnification ratio from reticle to the glass plate. The amount of lift or rise on the shutter or cam profile per one step motor pulse is equal to 10 times the amount the table moves in 30 emitter pulses. There would be a 10 to 1 reduction in optics from the reticle to the glass plate.

In practice the stepping motor pulse rate is made fast enough so that the motor runs smoothly instead of in steps. This requires that the motor be accelerated up to speed and decelerated for stopping so as not to get out of step. The metered control pulses to the bi-directional drive unit 95 must be variably spaced according to step motor servo practice to obtain smooth acceleration and deceleration. To accomplish this, the pulse metering counter 94 is controlled by a motor pulse counter 96. For example, the second metered pulse to the bi-directional drive is metered after some number $N_1$ emitter pulses; the third metered pulse is metered after some different number $N_2$ emitter pulses and so forth until the desired constant velocity (stepping rate) is achieved. Deceleration is handled in the same manner. The reticle remains fully covered (or open) during the acceleration and deceleration periods. Shuttering (active cam surface) occurs during the constant velocity portion of the sequence. The motor pulse counter 96 tells which metering counter output pulse we are on. For acceleration first widely spaced pulses are desired at the start and then less widely spaced. For example, 0, 60, 45, 35, 30, 30, 30, etc. Also, for deceleration a wide spaced pulse is provided first to allow the motor to get ahead of the pulses and then the spacing is narrowed down.

Position synchronism is achieved by summing the number of emitter pulses ($N_1 + N_2 + \ldots$ etc.) between the first metered pulse and the metered pulse coincident with the start of the active cam surface (shutter begins to open or close) and starting the step motor 35 early by this amount. The step motor has four windings 1, 2, 3, 4 for one direction and 4, 3, 2, 1 for the other direction. The bi-directional drive unit 95 uses a ring counter to control the winding sequence. A control logic circuit unit 97 is provided to control the position of start, direction of motor rotation, which motor opens and which motor closes, and the axis from which the emitter pulses come in accordance with instruction data from a suitable numerical control input unit 98 and the position of the positioning system.

A good approximation of synchronism can also be achieved using the above-described method, but replacing the position emitter pulses with oscillator pulses carefully calibrated to simulate positioning system movement.

It can be seen that the above-described optical exposure head provides a flexible and improved method of insuring uniform exposures during line starts and line terminations on an automatic artwork generator and especially in the case where high intensity illumination which cannot be contracted by other means is necessary. In the case of constant table velocity, the use of synchronized field shutters is essential.

While the invention has been particularly shown and described with reference to a preferred embodiment thereof, it will be understood by those skilled in the art that various changes in form and details may be made therein without departing from the spirit and scope of the invention.

What is claimed is:

1. In an optical system having a light source, condensing lens and projection lens for tracing a configuration on a photosensitized plate moving at a constant velocity, the combination of:

a reticle positioned between said condensing lens and projection lens and having a pattern defining the configuration to be traced;

a circular disc opening shutter and a circular disc closing shutter adjacent said reticle for independent rotation across said configuration pattern with each shutter having an identical profile of a constant velocity cam, said opening shutter being normally in position to completely cover said pattern and the closing shutter normally in position to completely uncover said pattern; and means for rotating said shutters in synchronism with the movement of said plate for uncovering and covering said pattern to provide uniform exposure of the configuration being traced on said photosensitized plate.

2. In an optical system having a light source, condensing lens and projection lens for tracing lines on a photosensitized plate moving at a constant velocity, the combination of:

a reticle positioned between said condensing lens and projection lens and having a rectangular pattern for defining the line to be traced;

a circular disc opening shutter and a circular disc closing shutter adjacent said reticle for independent rotation across said rectangular pattern with each shutter having an identical profile of a constant velocity cam, said opening shutter being normally in position to completely cover said pattern and the closing shutter normally in position to completely uncover said pattern; and means for rotating said shutters in synchronism with the movement of said plate for uncovering and covering said rectangular pattern to provide uniform exposure at the ends of a line being traced on said photosensitized plate.

3. In an optical system having a light source, condensing lens and projection lens for tracing lines on a photosensitized plate moving at a constant velocity, the combination of:

a reticle positioned between said condensing lens and projection lens and having a rectangular pattern for defining the line to be traced;

a circular disc opening shutter and a circular disc closing shutter adjacent said reticle for independent rotation across said rectangular pattern with each shutter having an identical profile of a constant velocity cam, said opening shutter being normally in position to completely cover said pattern and the closing shutter normally in position to completely uncover said pattern;

means for rotating said opening shutter in synchronism with said moving plate to uncover said pattern and start tracing a line; and means for rotating said closing shutter in synchronism with said moving plate to cover said pattern and terminate a line being traced.

4. In an optical system having a light source, condensing lens and projection lens for tracing lines on a photosensitized plate moving at a constant velocity, an optical exposure head comprising:

a rotatable support plate on which said light source and condensing lens are mounted;

a circular disc opening shutter and a circular disc closing shutter mounted on said plate for independent rotation with each shutter having an identical profile of a constant velocity cam, said opening shutter being rotatable out of the light path from said light source and condensing lens to initiate a tracing operation and said closing shutter being rotatable into said light path to terminate a tracing operation;

a reticle index wheel mounted to said support plate and adapted for independent rotation, the periphery of said reticle wheel being adjacent said shutters and in the light path between said shutters and projection lens;

a plurality of reticles arranged around the periphery of said reticle wheel and slideably mounted for radial movement, each reticle having a pattern for defining a different size line to be traced;

driving means for indexing said reticle wheel to bring a selected reticle in position adjacent said shutters; and driving means for moving said selected reticle radially outward into said light path preparatory to a tracing operation.

5. An optical system as defined in claim 4 including a pair of stepping motors mounted on said support plate for rotating said shutters in synchronism with the movement of said photosensitive plate whereby a line will be traced with uniform exposure throughout.

6. In an optical system having a light source, condensing lens and projection lens for tracing lines on a photosensitized plate moving at a constant velocity, an optical exposure head comprising:

a rotatable support plate on which said light source and condensing lens are mounted;

a circular disc opening shutter and a circular disc closing shutter mounted on said plate for independent rotation in the light path from said light source and condensing lens, each shutter having an identical profile of a constant velocity cam;

a reticle index wheel mounted to said support plate and adapted for independent rotation, the periphery of said reticle wheel being adjacent said shutters and in the light path between said shutters and projection lens;

a plurality of reticles arranged around the periphery of said reticle wheel and slideably mounted for radial movement, each reticle having a rectangular pattern for defining a different size line to be traced;

driving means for indexing said reticle wheel to bring a selected reticle in position adjacent said shutters;

driving means for moving said selected reticle radially outward into said light path preparatory to a tracing operation, said opening shutter being normally in position to completely cover and said closing shutter normally in position to completely uncover the rectangular pattern in the selected reticle;

a stepping motor mounted on said support plate for rotating said opening shutter in synchronism with said moving plate to uncover the rectangular pattern in said selected reticle and start tracing a line; and a stepping motor mounted on said support plate for rotating said closing shutter in synchronism with said moving plate to cover the rectangular pattern in said selected reticle and terminate the line being traced.

7. An optical system as defined in claim 6 including driving means for rotating said support plate 90° in either direction, said support plate carrying the reticle index wheel in an arc whereby tracing may be carried out at both 0° and 90° orientations.

8. In an optical system having a light source, condensing lens and projection lens for tracing lines on a photosensitized plate moving at a constant velocity, an optical exposure head comprising:

a rotatable support plate on which said light source and condensing lens are mounted;

a circular disc opening shutter and a circular disc closing shutter mounted on said plate for independent rotation with each shutter having an identical profile of a constant velocity cam, said opening shutter being rotatable out of the light path from said light source and condensing lens to initiate a tracing operation and said closing shutter being rotatable into said light path to terminate a tracing operation;

a reticle index wheel mounted to said support plate and adapted for independent rotation;

a plurality of wedge-shaped pockets arranged around the periphery of said reticle wheel, said periphery being adjacent said shutters and in the light path between said shutters and projection lens;

a reticle holder in the form of a pie-shaped segment slideably mounted for radial movement in each said pocket, each reticle holder including a reticle having a rectangular pattern for defining a different size line to be traced;

driving means for indexing said reticle wheel to bring a selected holder and reticle in position adjacent said shutters; and a pin and slide block mechanism mounted to said reticle wheel and operable to engage and move said selected holder and reticle radially outward into said light path preparatory to a tracing operation.

9. An optical system as defined in claim 8 and including a fixed member adjacent the periphery of said reticle wheel for engaging and locating in tracing position the reticle holder that is moved radially outward.

10. In an optical system having a light source, condensing lens and projection lens for tracing lines on a photosensitized plate moving at a constant velocity, the combination of:

a reticle positioned between said condensing lens and projection lens and having a rectangular pattern for defining the line to be traced;

a circular disc opening shutter and a circular disc closing shutter adjacent said reticle for rotation across said rectangular pattern with each shutter having an identical profile of a constant velocity cam, said opening shutter being normally set to the high point on the cam surface to completely cover said pattern and the closing shutter normally set to the low point on the cam surface to completely uncover said pattern;

means for rotating said opening shutter in synchronism with said moving plate whereby its cam surface falls causing said pattern to be uncovered and the tracing of a line started; and means for rotating said closing shutter in synchronism with said moving plate whereby its cam surface rises causing said pattern to be covered to terminate a line being traced.

11. In an optical system having a light source, condensing lens, a reticle, and projection lens for tracing lines on a photosensitized plate, the combination of:

an x-y table drive for moving said photosensitized plate at a constant velocity beneath said reticle;

emitter means associated with said table drive for emitting a pulse for each unit of distance of table travel;

a circular disc opening shutter and a circular disc closing shutter adjacent said reticle for independent rotation across said reticle with each shutter having an identical profile of a constant velocity cam, said opening shutter being normally in position to completely cover said reticle and the closing shutter normally in position to completely uncover said reticle;

a first stepping motor for rotating said opening shutter to uncover said reticle to start tracing a line and a second stepping motor for rotating said closing shutter to cover said reticle and terminate the tracing of a line; and pulse metering counter means responsive to said emitter pulses for delivering a control pulse to said stepping motors for each occurrence of a specific number of emitter pulses whereby said shutters will be rotated in synchronism with the movement of said photosensitized plate.

12. In an optical system having a light source, condensing lens, a reticle, and projection lens for tracing lines on a photosensitized plate, the combination of:

an x-y table drive for moving said photosensitized plate at a constant velocity beneath said reticle;

emitter means associated with said table drive for emitting a pulse for each unit of distance of table travel;

a circular disc opening shutter and a circular disc closing shutter adjacent said reticle for independent rotation across the reticle with each shutter having an identical profile of a constant velocity cam, said opening shutter being normally in position to completely cover said reticle and the closing shutter normally in position to completely uncover said reticle;

a stepping motor for rotating said opening shutter to uncover said reticle and start tracing a line;

a second stepping motor for rotating said closing shutter to cover said reticle and terminate a line being traced;

bi-directional drive means for each stepping motor; and pulse metering counter means responsive to said emitter pulses for delivering a control pulse to said bi-directional drive means for each occurrence of a specific number of emitter pulses whereby said shutters will be rotated in synchronism with the movement of said photosensitized plate.

13. In an optical system having a light source, condensing lens, a reticle, and projection lens for tracing lines on a photosensitized plate, the combination of:

an x-y table drive for moving said photo-sensitized plate at a constant velocity beneath said reticle;

emitter means associated with said table drive for emitting a pulse for each unit of distance of table travel;

a circular disc opening shutter and a circular disc closing shutter adjacent said reticle for independent rotation across the reticle with each shutter having an identical profile of a constant velocity cam, said opening shutter being normally in position to completely cover said reticle and the closing shutter normally in position to completely uncover said reticle;

a stepping motor for rotating said opening shutter to uncover said reticle and start tracing a line;

a second stepping motor for rotating said closing shutter to cover said reticle and terminate a line being traced;

bi-directional drive means for each stepping motor;

pulse metering counter means responsive to said emitter pulses for delivering a control pulse to said bi-directional drive means for each occurrence of a specific number of emitter pulses whereby said shutters will be rotated at a constant velocity in synchronism with the movement of said photosensitized plate; and means for controlling said metering counter means to variably space said control pulses so that said shutters will accelerate up to the constant velocity and decelerate for stopping, said shutters uncovering and covering said reticle during the constant velocity portion of the sequence.

14. An optical system as defined in claim 13 including numerical control input means; and control logic means responsive to said input means and said x-y table drive for determining stepping motor direction, table axis with which to synchronize, and starting point of tracing.

* * * * *